2,855,300

PROCESS FOR FIXING IMAGES ON DYE CYANIDE PHOTOSENSITIZED MATERIALS

Lyman Chalkley, Prince Georges County, Md.

No Drawing. Application August 10, 1956
Serial No. 603,242

20 Claims. (Cl. 96—48)

This invention relates to a process for fixing images on dye cyanide photosensitized materials, and more particularly to a chemical treatment for bringing about the fixing.

The colored images formed by irradiation of papers, textiles, etc., sensitized with dye cyanides have value as records, decorations, etc., but in order to put them to such use the materials must be fixed so as to preserve the colored image and to desensitize the dye cyanide in such a way that further color will not be formed on additional exposure to radiation.

One method for fixing images on dye cyanide sensitized materials has been disclosed in my copending patent application Serial No. 416,965, filed on March 17, 1954, now Patent Number 2,844,465. This method is limited to materials sensitized with hydrophobic dye cyanides, and leaves the colored image in the form of the simple triphenylmethane dye formed by the action of light. As is well known, these dyes are not very light fast and may fade on prolonged exposure of the fixed image to strong visible light.

The fixing method now to be described has the advantages that it is applicable to materials sensitized with hydrophilic as well as hydrophobic dye cyanides, and that its use results in a great increase in the light fastness of the colored images so that they can stand long exposure to strong visible light without fading.

The process consists in treatment of the printed dye cyanide sensitized paper, textile, or other material, with a polyacid of tungsten or molybdenum, or a mixed polyacid of tungsten and molybdenum. It is the ion of the polyacid that is effective in the fixing process, and therefore it is immaterial whether the ion is supplied by use of the free polyacid or by use of a soluble salt of the polyacid. Therefore, in the following description references to polyacids also apply to their soluble salts.

The simple ortho acids, $H_2WO_4$ and $H_2MoO_4$, known, for example, in the form of their sodium salts, are not effective fixing agents for use in the present process. When solutions of salts of the ortho acids are acidified polyacids are formed by condensation of two or more molecules of the ortho acids with loss of water. Thus the ratio of ionizable hydrogen to molybdenum or tungsten is less in the polyacids than in the ortho acids. It appears that several polyacids exist with different ratios of ionizable hydrogen to the tungsten or molybdenum atom. Those that are formed and stable in solutions of pH less than 5 are most suitable for use in the present process.

In addition to the simple or homopolyacids formed from ortho tungstic acid or ortho molybdic acid, there may be mixed polyacids formed by intercondensations of tungstic with molybdic acid. These also are suitable fixing agents.

In a third class are the heteropolyacids which contain in addition to tungsten and/or molybdenum also an acid forming element of another group of the periodic system. The heteropolyacids containing phosphorous and silicon are particularly useful in the present process, examples being the phosphotungstic acids, the phosphomolybdic acids, silicotungstic acid, and the phosphotungstomolybdic acids.

The polyacids and their salts have their greatest stability in acid conditions. In alkaline solution they tend to decompose with hydration to the ineffective ortho acids or salts. While some of the polyacids are stable in solutions with as low acidity as pH 7, I prefer to use the polyacids and their salts in solutions more acid than pH 5, a range of pH 4 to pH 0 giving excellent results. The desired acidity may be attained by addition of a mineral acid such as hydrochloric, sulfuric or nitric.

The materials that may be fixed by the polyacids are those sensitized with para amino substituted triphenylacetonitriles, generally referred to as the cyanides of triphenylmethane dyes. Examples of suitable sensitizers are malachite green cyanide, brilliant green cyanide, pararosaniline cyanide, rosaniline cyanide, new fuchsine cyanide, crystal violet cyanide, the N-hydroxyethyl pararosaniline cyanides, ethyl green cyanide, methyl green cyanide, malachite green cyanide monomethochloride, malachite green cyanide monoethiodide, Helvetia green cyanide, fast acid violet cyanide, formyl violet (acid violet S4B) cyanide, patent blue V cyanide, xylene blue VS cyanide, erioglaucine cyanide.

A photographic print upon a dye cyanide sensitized material normally contains both dyestuff that has been formed in the printing operation and unchanged dye cyanide. The polyacids have a dual action upon such a mixture. They convert the dyestuff into a pigment that is insoluble in water and therefore will not diffuse or "run" to mar the sharpness of the image, and which also has a greatly enhanced lightfastness. The polyacids act upon the unchanged dye cyanide to convert it into a compound that is no longer sensitive to the radiation that otherwise would convert it into a dye; i. e., the polyacids have a desensitizing effect upon the dye cyanides. Thus fixing is achieved without the necessity for removing anything from the printed material. All that is needed is to add the fixing solution to the print, which may be done by spraying or coating or bathing the print with the fixing solution. An excess of fixing material may be left in the print or washed out.

The fixing agent may be applied to the print by any convenient method, such as bathing or spraying. The more concentrated solutions, up to 40% to 50% of polyacid, are the more suitable for fixing by spraying. The more dilute solutions, down to about 0.1% are preferable for use by bathing. The most convenient solvent is generally water, although some of the polyacids, especially the heteropolyacids, are soluble in a wide variety of other solvents, such as methyl alcohol, ethyl alcohol, n-propyl alcohol, i-propyl alcohol, ethyleneglycol monethyl ether, ethyleneglycol monomethyl ether, ethyleneglycol dimethyl ether, ethyleneglycol diethylether, diethyl ether, di-i-propyl ether, dioxane, ethyleneglycol, glycerine, and many others. Solutions in the organic solvents may also be used for fixing.

While the concentration of the fixing agent in the fixing solution is not critical it is desirable for optimum results to use sufficient fixing solution to provide at least one equivalent of polyacid, or a corresponding amount of its ion in the form of a salt, to each amino group present in the sensitized material being fixed.

If the sensitizing dye cyanide contains one or more sulfonic acid groups the polyacids when used alone may have a less effective fixing action than they exert upon the unsulfonated dye cyanide sensitized materials. When this effect is observed it may take the form of incomplete desensitization of the unchanged dye cyanide so that the print is still somewhat sensitive to radiation, or the dye image may not be completely insolubilized and may have a tendency to diffuse and to lose its sharpness, or to lose strength on washing with water. When it occurs, this incomplete fixing may be counteracted by the addition of metallic ions to the polyacid fixing solution. An alkali metal ion, such as that of potassium, is effective in some cases, although the polyvalent ions are more generally effective. Ions of the following metals have proved useful with polyacids when used to fix sulfonated dye cyanide sensitized materials: Magnesium, calcium, strontium, barium, copper (cupric), manganese, zinc, cobalt, bismuth, iron, tin (stannic). Of course, the metal chosen should not form an insoluble salt with the particular polyacid used in the fixing solution. It is desirable to have the metal ion present in such quantity that at least one equivalent of metal is available for each sulfonic acid group in the material to be fixed. An excess of metal ion does no harm. Solutions containing metal ions may be used to fix unsulfonated as well as sulfonated dye cyanide sensitized materials.

After the solution of fixing agent has been applied the print may be dried without washing, or the excess polyacid solution may be washed out with water before drying. When the fixing solution contains a colored ion, such as a phosphomolybdate having a ratio of phosphorus atoms to molybdenum atoms of 1:12, or cobalt or ferric, it is desirable to wash the fixed print to remove the color. Also the color of some dyes is sufficiently sensitive to acid to undergo a change when treated with the more strongly acid fixing solutions. In such a case washing may be desirable to restore the normal hue of the printed image by removing excess acid.

The following examples will make the operation of the process clearer, although it is not limited to these applications and many others will be apparent to one skilled in the art.

Example 1

Paper sensitized with pararosaniline cyanide as described in Example 11 of U. S. Patent No. 2,676,887 is printed and then bathed at room temperature for 2 minutes in a freshly prepared mixture of 1 volume of 2% aqueous sodium orthotungstate and 2 volumes of N/10 hydrochloric acid. Excess moisture is blotted from the print and it is air dried.

Example 2

Paper sensitized with pararosaniline cyanide as described in Example 11 of U. S. Patent No. 2,676,887 is printed and then bathed at room temperature for 2 minutes in 2.6% aqueous phosphotungstic acid, $H_3PW_{12}O_{40}$. The excess solution is removed by blotting with thick filter paper and the print air dried.

Example 3

Paper sensitized with pararosaniline cyanide as described in Example 11 of U. S. Patent No. 2,676,887 is printed and then bathed at room temperature for 2 minutes in a 1.4% aqueous solution of phosphomolybdic acid, $H_3PMo_{12}O_{40}$, rinsed in water and air dried.

Example 4

Water leaf paper sensitized by moistening with a 2% i-propyl alcohol solution of trihydroxyethyl-pararosaniline cyanide, the synthesis of which was described in Example 15 of copending application, Serial No. 550,773, now abandoned, and dried is printed and bathed for two minutes in the tungstic acid solution described in Example 1 above, blotted with filter paper and air dried.

Example 5

Paper sensitized with pararosaniline cyanide as described in Example 11 of U. S. Patent No. 2,676,887 is printed and then sprayed until thoroughly moist with a 4% aqueous solution of ammonium tungstate. (Ammonium tungstate of commerce is a salt of the polyacid, paratungstic acid.) The moistened paper is dried in a stream of air heated to 100°.

Example 6

Paper sized with hydrogenated rosin is sensitized by coating with a 2% aqueous solution of ethyl green cyanide, the preparation of which was described in Example 17 of copending application, Serial No. 550,773, dried and printed. The print is fixed by bathing for 2 minutes at room temperature in a 2% aqueous solution of American Chemical Society reagent standard grade of ammonium molybdate, blotted with filter paper and dried. (Reagent grade ammonium molybdate is the salt of the polymolybdic acid, $H_6Mo_7O_{24}$. The 2% solution has an acidity of approximately pH 4.9.)

Example 7

Paper sized with hydrogenated rosin and sensitized by coating with a warm 2% solution of acid violet S4B cyanide disodium salt (preparation described in Example 6 of copending application Serial No. 550,773), and drying, is printed and fixed for two minutes in a freshly prepared mixture of 1 volume of 1.3% aqueous sodium orthomolybdate solution and 2 volumes of N/10 hydrochloric acid. The treated paper is air dried.

Example 8

Paper coated with acid violet S4B cyanide as in Example 7 is printed and fixed by bathing for 2 minutes in a mixture of 1 volume of 25% aqueous barium chloride dihydrate and 20 volumes of 2.6% aqueous phosphotungstic acid, $H_3PW_{12}O_{40}$, rinsed in water and air dried.

Example 9

Paper coated with acid violet S4B cyanide as in Example 7 is printed and fixed for 2 minutes in a mixture of 1 volume of 25% aqueous barium chloride dihydrate and 20 volumes of 1.4% aqueous 12 series phosphomolybdic acid. The fixed print is washed briefly in water and air dried.

Example 10

The acid violet S4B cyanide sensitized paper of Example 7 is printed and fixed by spraying on the sensitized surface a 10% aqueous solution of silicotungstic acid, $H_4SiW_{12}O_{40}$, and air dried.

Example 11

Paper sensitized with trihydroxyethyl-pararosaniline cyanide as in Example 4 is printed and fixed by bathing for 2 minutes in an 8% aqueous solution of silicotungstic acid, and air dried.

Example 12

Paper sized with hydrogenated rosin is sensitized by coating at 40° C. with a 2% aqueous solution of Helvetia green cyanide sodium salt, the synthesis of which is described in Example 4 of copending application Serial No. 550,773, and dried. Prints on this paper are fixed by spraying with a solution of silicotungstic acid, $H_4SiW_{12}O_{40}$, 2%, and barium chloride dihydrate, 1.25%, in N/100 hydrochloric acid and drying in a stream of warm (100° C.) air.

Example 13

The Helvetia green cyanide sensitized paper of Example 12 is fixed with the phosphotungstic acid and barium chloride solution of Example 8.

Example 14

The Helvetia green sensitized paper of Example 12 is fixed with the phosphomolybdic acid and barium chloride solution of Example 9 and air dried without washing.

Example 15

The Helvetia green cyanide sensitized paper of Example 12 is printed and bathed for 2 minutes in a mixture of 1 volume of molar aqueous calcium chloride and 10 volumes of 2.6% aqueous 12 series phosphotungstic acid, rinsed with water and air dried.

Example 16

The Helvetia green cyanide sensitized paper of Example 12 is printed and bathed for 2 minutes in a mixture of 1 volume of molar aqueous strontium chloride and 10 volumes of 1.4% aqueous 12 series phosphomolybdic acid, and dried between blotters.

Example 17

The Helvetia green cyanide sensitized paper of Example 12 is printed and fixed by spraying with a 2% solution of potassium luteophosphotungstate, $K_3PW_9O_{31} \cdot 7H_2O$, in N/10000 aqueous orthophosphoric acid.

Example 18

Paper sized with hydrogenated rosin is sensitized by coating with 2% aqueous patent blue V cyanide disodium salt, the synthesis of which is described in Example 3 of copending application Serial No. 550,773, and dried and printed. The print is fixed by bathing for 2 minutes in the solution of phosphotungstic acid and barium chloride described in Example 8.

Example 19

Paper sized with hydrogenated rosin is sensitized by coating with 2% aqueous fast acid violet 10B cyanide disodium salt, the synthesis of which is described in Example 8 of copending application Serial No. 550,-773, and dried and printed. The print is fixed by bathing for 2 minutes in the solution of phosphotungstic acid and barium chloride described in Example 8.

Example 20

Paper sized with hydrogenated rosin is sensitized by coating at 40° C. with 2% aqueous erioglaucine cyanide strontium potassium salt, the synthesis of which is described in Example 11 of copending application Serial No. 550,773, and dried and printed. The print is fixed by bathing for 2 minutes in the solution of phosphotungstic acid and barium chloride described in Example 8.

Example 21

A fixing solution is prepared by mixing 1 volume of a molar aqueous solution of sodium orthotungstate with 3 volumes of a molar aqueous solution of sodium orthomolybdate and 4 volumes of an aqueous solution 2.2 normal in hydrochloric acid and 0.1 molar in orthophosphoric acid, bringing the mixture to a boil and allowing it to cool. The fixing solution prepared in this way contains the phosphotungstomolybdic acid, $H_3PW_3Mo_9$. Paper sensitized with pararosaniline cyanide as described in Example 11 of U. S. Patent No. 2,676,887 is fixed after printing by bathing at room temperature in the above solution for 2 minutes, washing for 1 minute in water and drying in a 100° C. oven.

Example 22

A fixing solution is prepared by mixing 1 volume of a molar aqueous solution of sodium orthotungstate with 1 volume of a molar aqueous solution of sodium orthomolybdate and 2 volumes of an aqueous solution 2.2 normal in hydrochloric acid and 0.1 molar in orthophosphoric acid, bringing the mixture to a boil and allowing it to cool. The fixing solution prepared in this way contains the phosphotungstomolybdic acid, $H_3PW_9Mo_6O_{40}$. Paper sensitized with pararosaniline cyanide as described in Example 11 of U. S. Patent No. 2,676,887 is fixed after printing by bathing at room temperature in the above solution for 2 minutes, washing for 1 minute in water and drying in the air at room temperature.

Example 23

A fixing solution is prepared by mixing 1 volume of a molar aqueous solution of sodium orthomolybdate with 3 volumes of a molar aqueous solution of sodium orthotungstate and 4 volumes of an aqueous solution 2.2 normal in hydrochloric acid and 0.1 molar in orthophosphoric acid, bringing the mixture to a boil and allowing it to cool. The fixing solution prepared in this way contains the phosphotungstomolybdic acid $H_3PW_9Mo_3O_{40}$. Paper sensitized with pararosaniline cyanide as described in Example 11 of U. S. Patent No. 2,676,887 is fixed after printing by bathing at room temperature in the above solution for 2 minutes, washing for 1 minute in water and drying in the air at room temperature.

Example 24

Waterleaf paper sensitized by impregnating with a methyl alcohol solution of malachite green cyanide monethiodide (Example 18 of copending application Serial No. 550,773) and drying is printed by a hot quartz mercury lamp. The yellow image that prints out fades again in the dark, but it may be fixed, either before or after it has faded in the dark, by treatment with a 1% aqueous solution of phosphotungstic acid, $H_3PW_{12}O_{40}$, which gives the image a strong orange color.

Example 25

A print on the patent blue V cyanide sensitized paper described in Example 18 is fixed by bathing for two minutes in a solution composed of 1 volume of molar cupric sulfate and 10 volumes of 1.4% phosphomolybdic acid, $H_3PMo_{12}O_{40}$. The print is then washed in water and dried.

Example 26

A print on patent blue V cyanide sensitized paper is fixed by bathing for two minutes in a solution composed of 1 volume of molar magnesium sulfate and 10 volumes of a 1.4% solution of phosphomolybdic acid, $H_3PMo_{12}O_{40}$, rinsed and dried.

Example 27

A print on patent blue V cyanide sensitized paper is fixed by bathing for two minutes in a solution composed of 1 volume of molar zinc chloride and 20 volumes of 1.4% phosphomolybdic acid, $H_3PMo_{12}O_{40}$, rinsed and dried.

Example 28

A print on the acid violet S4B cyanide sensitized paper of Example 7 is fixed by bathing for 2 minutes in a solution composed of 1 volume of molar magnesium sulfate and 10 volumes of 6.5% aqueous phosphotungstic acid, $H_3PW_{12}O_{40}$, and dried without washing.

Example 29

A print on acid violet S4B cyanide sensitized material is fixed by bathing for two minutes in a solution composed of 1 volume of molar calcium nitrate and 10 volumes of 6.5% aqueous phosphotungstic acid, $H_3PW_{12}O_{40}$, and dried without washing.

Example 30

A print on acid violet S4B cyanide sensitized material is fixed by bathing for two minutes in a solution composed of 1 volume of molar calcium nitrate and 20 volumes of a 1.4% solution of phosphomolybdic acid, $H_3PMo_{12}O_{40}$, washed and dried.

Example 31

A print on acid violet S4B cyanide sensitized paper is fixed by bathing for two minutes in a solution composed of 1 volume of molar strontium chloride and 10 volumes of 6.5% aqueous phosphotungstic acid, $H_3PW_{12}O_{40}$, and dried without washing.

Example 32

A print on acid violet S4B cyanide sensitized paper is fixed by bathing for two minutes in a solution composed of 1 volume of molar strontium chloride and 15 volumes of aqueous 1.4% phosphomolybdic acid, $H_3PMo_{12}O_{40}$, and washed and dried.

Example 33

A print on acid violet S4B cyanide sensitized paper is fixed by bathing for two minutes in a solution composed of 1 volume of manganese chloride and 10 volumes of 6.5% phosphotungstic acid, $H_3PW_{12}O_{40}$, washed and dried.

Example 34

A print on acid violet S4B cyanide sensitized paper is fixed by bathing for 2 minutes in a solution containing 3.5 g. of stannic chloride, $SnCl_4 \cdot 5H_2O$, and 1.5 g. of phosphomolybdic acid, $H_3PMo_{12}O_{40}$, in 100 ml. of water with sufficient hydrochloric acid to hold the tin in solution. The fixed paper is washed and dried.

Example 35

A print on acid violet S4B cyanide sensitized paper is fixed by bathing for 2 minutes in a solution composed of 1 volume of molar cobalt chloride and 10 volumes of 6.5% phosphotungstic acid, $H_3PW_{12}O_{40}$, and washed and dried.

Example 36

A print on acid violet S4B cyanide sensitized paper is fixed by bathing for 2 minutes in a solution composed of 1 volume of molar bismuth chloride, 10 volumes of 1.4% phosphomolybdic acid, $H_3PMo_{12}O_{40}$, and sufficient hydrochloric acid to hold the bismuth in solution. The paper is then washed until the image loses the blue or greenish blue hue produced by the strongly acid solution and dried.

I claim:

1. A process for fixing a photographic image on a print formed by exposing a paramino-triphenylacetonitrile sensitized material to provide reacted and unreacted sensitizer defining said image, comprising contacting said print with a fixing solution containing a compound selected from the group consisting of polyacids of molybdenum, polyacids of tungsten, and salts of said polyacids, said polyacids being condensed and molecularly dehydrated orthoacids, so as to preserve the color of the reacted sensitizer and render the unreacted sensitizer insensitive to further exposure.

2. The process of claim 1 wherein said fixing solution also contains a dissolved salt of a metal other than molybdenum and tungsten.

3. The process of claim 2 wherein said dissolved salt is a salt of a polyvalent metal.

4. The process of claim 1 wherein said compound is a mixed polyacid formed by an intercondensation of tungstic acid and molybdic acid.

5. The process of claim 1 wherein said compound is a heteropolyacid containing, in addition to an element selected from the group consisting of tungsten and molybdenum, an acid-forming element of another group of the periodic system.

6. The process of claim 1 wherein said compound is a heteropolyacid containing an element selected from the group consisting of tungsten and molybdenum combined with an element selected from the group consisting of phosphorus and silicon.

7. The process of claim 1 wherein said compound is a heteropolyacid containing both tungsten and molybdenum and at least one additional acid-forming element.

8. The process of claim 7 wherein said additional acid-forming element is selected from the group consisting of phosphorus and silicon.

9. The process of claim 7 wherein said compound is a phosphotungstomolybdic acid.

10. The process of claim 1 wherein said compound is a polyacid of tungsten.

11. The process of claim 1 wherein said compound is a polyacid of molybdenum.

12. The process of claim 1 wherein said compound is a heteropolyacid of tungsten and an acid-forming element selected from the group consisting of phosphorus and silicon.

13. The process of claim 12 wherein said compound is a phosphotungstic acid.

14. The process of claim 12 wherein said compound is a silicotungstic acid.

15. The process of claim 1 wherein said compound is a heteropolyacid of molybdenum and an acid-forming element selected from the group consisting of phosphorus and silicon.

16. The process of claim 15 wherein said compound is a phosphomolybdic acid.

17. The process of claim 15 wherein said compound is a silicomolybdic acid.

18. A process for fixing a photographic image on a print formed by exposing a paramino-triphenylacetonitrile sensitized material to provide reacted and unreacted sensitizer defining said image, comprising contacting said print with a fixing solution having a pH less than about 5, said solution containing a compound selected from the group consisting of polyacids of molybdenum, polyacids of tungsten, and salts of said polyacids, said polyacids being condensed and molecularly dehydrated orthoacids, so as to preserve the color of the reacted sensitizer and render the unreacted sensitizer insensitive to further exposure.

19. A process for fixing a photographic image on a print formed by exposing a material which has been sensitized with a paramino-triphenylacetonitrile compound containing at least one sulfonic acid group in the molecule to provide reacted and unreacted sensitizer defining said image, comprising contacting said print with a fixing solution containing a compound selected from the group consisting of polyacids of molybdenum, polyacids of tungsten, and salts of said polyacids, said polyacids being the condensation product of at least two molecules of orthoacid with molecular loss of water, said solution also containing a dissolved salt of a metal other than molybdenum and tungsten, so as to preserve the color of the reacted sensitizer and render the unreacted sensitizer insensitive to further exposure.

20. The process of claim 19 wherein said dissolved salt of a metal other than tungsten and molybdenum is a salt of a polyvalent metal.

References Cited in the file of this patent

UNITED STATES PATENTS

| 1,916,350 | Wendt et al. | July 4, 1933 |
| 2,145,960 | Wheatley et al. | Feb. 7, 1939 |
| 2,319,344 | Polgar et al. | May 18, 1943 |
| 2,427,433 | Cochran | Sept. 16, 1947 |
| 2,441,561 | Chalkley | May 18, 1948 |

FOREIGN PATENTS

| 670,883 | Great Britain | Apr. 30, 1952 |